United States Patent [19]

Elsbett et al.

[11] 4,213,438
[45] Jul. 22, 1980

[54] PISTON FOR INTERNAL COMBUSTION ENGINES, ESPECIALLY DIESEL ENGINES

[76] Inventors: Ludwig Elsbett; Günter Elsbett, both of Industriestrasse 14, D8543 Hilpoltstein, Fed. Rep. of Germany

[21] Appl. No.: 920,055

[22] Filed: Jun. 28, 1978

Related U.S. Application Data

[63] Continuation of Ser. No. 731,533, Oct. 12, 1976, abandoned.

[30] Foreign Application Priority Data

Oct. 11, 1975 [DE] Fed. Rep. of Germany ....... 2545588

[51] Int. Cl.² ................................................ F02F 3/02
[52] U.S. Cl. .................................. 123/668; 123/193 P
[58] Field of Search ........... 123/191 R, 191 A, 193 P, 123/41.35, 41.39

[56] References Cited

U.S. PATENT DOCUMENTS

| 1,245,641 | 11/1917 | Planck | 123/193 P |
| 3,730,163 | 5/1973 | Elsbett et al. | 123/32 B |
| 3,906,924 | 9/1975 | Elsbett | 123/193 P |
| 4,018,194 | 4/1977 | Mitchell et al. | 123/41.35 |

FOREIGN PATENT DOCUMENTS

| 511422 | 10/1930 | Fed. Rep. of Germany | 123/191 R |
| 253485 | 3/1970 | U.S.S.R. | 123/193 P |

Primary Examiner—Charles J. Myhre
Assistant Examiner—Craig R. Feinberg
Attorney, Agent, or Firm—Becker & Becker, Inc.

[57] ABSTRACT

A piston for internal combustion engines, especially Diesel engines, with a combustion chamber arranged in the piston head which latter is preferably designed as a ring carrier and is supported by a mantle connecting the ring carrier with the foot portion of the piston. The mantle partially surrounds the combustion chamber, and thermal insulation material or the like is provided between the mantle and the combustion chamber at least within the region of the combustion chamber opening. In addition to the just mentioned thermal insulation material, there are additional thermal insulation provisions made on the mantle between the latter and the ring carrier and/or the foot portion of the piston. The piston and the cylinder therefor are so designed with regard to each other that the piston engages the cylinder over a section located between the plane of the combustion chamber opening and an adjacent piston ring carried by the ring carrier.

6 Claims, 3 Drawing Figures

PISTON FOR INTERNAL COMBUSTION ENGINES, ESPECIALLY DIESEL ENGINES

This is a continuation of application Ser. No. 731,533, filed Oct. 12, 1976 now abandoned.

The present invention relates to a piston for internal combustion engines, especially Diesel engines, with a combustion chamber arranged in the head of the piston. The head of the piston is preferably designed as a ring carrier and is supported by a mantle which connects the ring carrier to a foot of the piston. This mantle in its turn surrounds the combustion chamber partially. The combustion chamber itself has at least within the region of the combustion chamber opening heat insulating means between the combustion chamber and the mantle, and the ring carrier is at that side thereof which faces the cylinder provided with at least one sealing means.

In connection with the construction of modern internal combustion engines, especially Diesel engines, it has been known for a long time that an optimum combustion between fuel and air particles is possible in particular when these components in addition to being thoroughly intermixed in a combustion chamber are also matched as to their temperatures because an optimum tempering of the fuel-air mixtures permits a combustion of these mixtures with a minimum of harmful emissions. In order to realize this tempering of the combustion chamber and consequently also of the fuel-air components, it is further known to provide the combustion chambers with linings and so to design the linings that a tempering of the combustion chambers will be effected in such a way that, for instance, in a spherical combustion chamber within the region of the combustion chamber opening a very hot zone will be located whereas within the region of the combustion chamber bottom a "cold", i.e., a less hot zone, will be located.

A heretofore known piston with central combustion chamber for fuel injection internal combustion engines of this type has, for instance, a ball-shaped combustion chamber which is arranged at the head of a piston and there, within the region of the combustion chamber opening, has means for heat insulation. The heat insulating substances are with this piston designed as inserts the depth of which into the combustion chamber, in other words the belt section thereof from the combustion chamber opening in the direction toward the combustion chamber bottom, extends only to such an extent as the fuel jet will extend into the combustion chamber during idling of the engine. This insert, as mentioned above, is provided within the region of the combustion chamber opening and with heretofore known designs is constricted preferably toward the combustion chamber center so that the fuel-air components which have to be introduced into the combustion chamber for combustion will during the discharge thereof from the combustion chamber once more pass the constricted areas of the insert, and in case they have not yet been burned up they will, when passing the constriction, be caused to burn up. As a result thereof, the proportion of waste gas emission will be reduced because only burned particles will be released from the combustion chamber into the exhaust system.

Due to the insertion of the heat insulating insert in the combustion chamber, in addition to the optimizing of the temperatures in the combustion chamber, it will also be realized that the heat flow to an annular support designed as sealing mantle will be interrupted to a major extent so that the sealing means adjacent thereto will be protected against a strong overheating. With internal combustion engines, especially engines for high power, it has been found that a further tempering of the combustion chamber and a further interruption in the heat flow from the combustion chamber, especially into the annular piston, would be desirable (see German Patent No. 1,576,013).

It is at this point that the present invention begins. More specifically, it is an object of the present invention so to insulate the combustion chamber of a piston of the above mentioned type against heat losses that in addition to the protection of the sealing means there will be obtained a further tempering of the combustion chamber and thereby also an optimum combustion.

The piston according to the present invention is characterized primarily in that in addition to the heat insulating means of the combustion chamber additional heat insulating means are provided on the mantle between the latter and the annular support and/or the foot of the piston, and that the piston through the intervention of a section located between the plane of the combustion chamber opening and a sealing ring adjacent thereto engages the cylinder.

Due to this additional insulation of the combustion chamber, not only the problem underlying the present invention has been solved in an advantageous manner, but it is also made possible that the piston with its mantle section which is located between the plane of the combustion chamber opening and the adjacent sealing ring engages the cylinder in such a way that this section will no longer have to be designed as a so-called fire web. The engagement of the cylinder by the mantle section furthermore brings about the advantage that that sealing ring which is adjacent to the plane of the combustion chamber opening will no longer be greatly subjected to the gas pressure during the combustion phase of the fuel-air components. Consequently this sealing ring will be able for a longer time to meet the expected requirements.

A further advantage of these steps consists in that, due to the mantle section engaging the cylinder wall, between this section and the cylinder wall practically no abrasive substances or carbon deposits can form which normally cause a considerable wear of the piston, especially of the piston rings.

A further advantageous development of the present invention consists in that the heat insulating means on the mantle are designed as constrictions of the mantle. Such heat insulation due to constrictions cannot only be produced in a simple manner but can also be more easily be provided at the desired areas of the mantle whereby a considerable heat insulation can be obtained.

Tests with pistons according to the invention furthermore have shown that the desired heat insulation will already be obtained when a constriction between the annular piston and the mantle is provided within the region of the plane of the combustion chamber opening and when a further constriction toward the lower part of the combustion chamber is provided within the region of the bottom of the combustion chamber. In particular also from a manufacturing standpoint it has been found that it is advantageous when the mantle at least from the constriction on between the latter and the annular support to the constriction within the region of the combustion chamber bottom is designed in a rotation symmetrical manner.

This object and other objects and advantages of the invention will appear more clearly from the following specification in connection with the accompanying drawings, in which.

Figure 2:
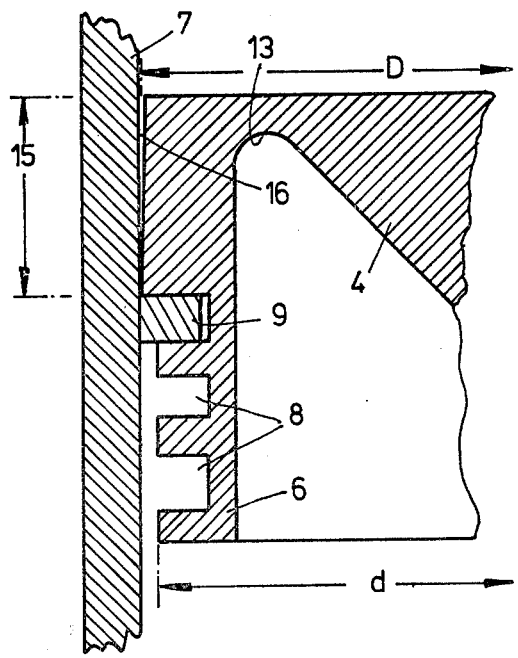
FIG. 2 illustrates on a larger scale than that of FIG. 1 that portion of FIG. 1 which is encircled in dot-dash lines.
Figure 3:
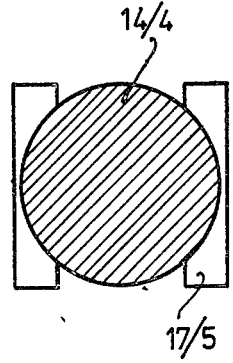
FIG. 3 represents a section taken along the line I—I of FIG. 1.

Referring now to the drawing in detail, on a piston 1 with preferably separate sealing mantle 2 and a guiding mantle (not shown in the drawing) a combustion chamber 3 is provided within the region of the piston head, said combustion chamber for reasons of simplified illustration being shown as rotation-symmetric body. The combustion chamber 3 is partially surrounded by a mantle 4 forming a connection between the sealing mantle 2 and a foot portion 5 of the piston 1. The sealing mantle 2 which in the specific illustration in the drawing is shown in the form of an annular support 6 is on the side thereof which faces a cylinder 7 provided with annular grooves 8 having inserted therein piston rings 9 which slidingly engage the cylinder and seal the piston 1 with regard to the cylinder. In order to assure a tempering of the combustion chamber 3 which tempering is necessary for an optimum combustion of the fuel and air components, a heat insulating insert 11 is provided in the combustion chamber especially within the region of the combustion chamber opening 10. This insert 11 is so designed that it will be able practically to interrupt a heat flow from the combustion chamber 3 through the mantle 4 into the carrier 6 for the piston rings 9. The insert 11 which may consist for instance of a poor heat conductor for instance of carbon or of a hollow metal ring, may in addition to its own heat insulating property additionally be heat insulated with regard to the mantle 4 while in such an instance a further heat insulation is obtained in the form of an air gap 12. In order still further to prevent a heat flow from the combustion of the fuel and air components from the combustion chamber 3 especially into the ring carrier 6, additional heat insulations are provided in the mantle 4 which for the sake of simplicity are shown as constrictions 13 13' of the mantle. One of these constrictions namely constriction 13' is provided within the region of the plane of the combustion chamber opening 10 between the mantle 4 and the ring carrier 6, and a further constriction namely the constriction 13 is provided upon the mantle within the region of the bottom 14 of the combustion chamber 3. These constrictions 13, 13' on the mantle 4 will assure that the heat withdrawal can be effected only through the bottom 14 of the combustion chamber 3 into the foot portion 5 of the piston 1 from which foot portion the heat can additionally by injection of a cooling medium such as cooling oil be withdrawn relatively quickly. In view of this heat insulation of the combustion chamber 3 and the inherent interruption of the heat flow from the combustion chamber 3 into the ring carrier 6, it will be assured that the piston rings 9 supported by the carrier 6 will be greatly relieved from heat effects so that the object underlying said rings 9 namely to seal the piston 1 with regard to the cylinder 7 can be realized to its full effect. Due to this nearly complete interruption of the heat flow to the ring carrier 6 and thus to the sealing mantle 2, it will be assured that in particular its section 15 (FIG. 2) between the plane of the combustion chamber opening 10 and the piston ring 9 next thereto no longer has to be designed as a so-called fire web but can be designed as a sealing mantle which can extend very close to the cylinder 7. Due to this extension of section 15 to nearly the cylinder 7 it will be assured that on one hand in the space 16 between the ring carrier 6 and cylinder 7 at the section 15 neither oil will be burned to carbon deposits nor other abrasive ashes will collect which due to their enormous aggressiveness might otherwise attack the cylinder 7 as well as the rings 9 and the annular grooves 8 therefor. Due to this effective interruption of the heat withdrawal from the combustion chamber 3 into the ring carrier 6, the honing of the piston may be so effected that already on a cold piston 1 the greater diameter D is located between the plane of the combustion chamber opening 10 and the uppermost piston ring 9 and that the smaller diameter d is located on the opposite end of piston 1. During the heating up of the piston 1, in particular this section 15 of the sealing mantle expands in radial direction so that this section will fully engage the cylinder 7 where it cools again to such an extent that an oil film between the cylinder and said last mentioned section will be retained as sealing sleeve.

Figure 1:
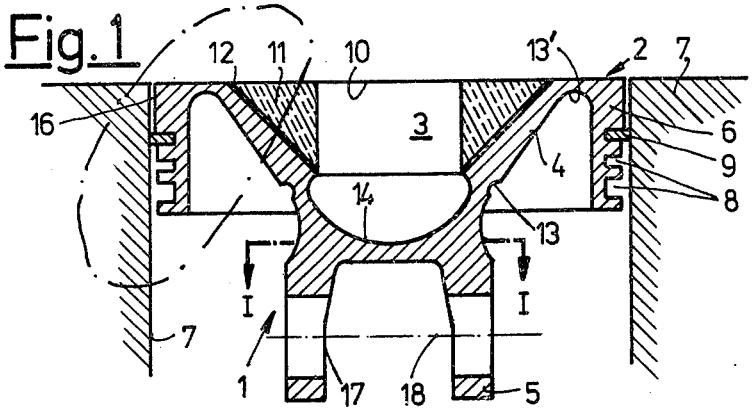
FIG. 1 represents a longitudinal section through a piston with heat insulating means according to the invention.

In FIG. 1, the constrictions 13, 13' are for a clearer illustration shown as pronounced notches. However, it is also possible to shape said constrictions 13, 13' differently in which instance it is merely to be kept in mind that the effect of the heat insulation should be retained.

In order to greatly simplify the manufacture of piston 1, its mantle 4, which connects the ring carrier 6 with the foot portion 5 of the piston is designed as rotation-symmetric part, and only the foot portion 5 of the piston is designed as the non-rotation-symmetric part namely as joint fork 17. This non-rotation-symmetric part for instance at the foot portion 5 of the piston 1 may start below the bottom 14 of the combustion chamber 3 and extend over the section which receives the joint fork 17 for a bolt bearing 18. Through the intervention of said bolt bearing 18, the foot portion 5 of piston 1 is connected to a connecting rod (not shown in the drawing) of a crank drive. Also the non-illustrated guiding means of the piston is connected to said connecting rod.

In the illustration of the piston according to FIG. 1, one constriction 13 is provided on the mantle 4 within the region of the bottom 14 of the combustion chamber 3. This, however, does not exclude that instead of such constriction 13, the heat insulating means is formed by a further radial extension of the combustion chamber 3 within the region of the bottom 14. In this connection, it is merely important that at this spot a constriction of the mantle is effected in order to produce the effect of a heat insulation or heat barrier.

It is, of course, to be understood that the present invention is by no means limited to the specific showing in the drawing but also comprises any modification within the scope of the appended claims.

What we claim is:

1. A piston for an internal combustion engine comprising in combination a piston head with a combustion chamber having a bottom wall and an opening in the top opposite said bottom wall, said piston head having an annular section spaced radially outwardly of said combustion chamber with peripheral grooves for receiving piston rings, said piston also including a foot portion integral with said bottom wall of said combustion chamber, a mantle surrounding said combustion chamber and integral with and interconnecting said annular section and said bottom wall of said combustion chamber and extending from said opening to said bottom wall of said combustion chamber, thermal insulation additionally provided as an annular insert between said mantle and said combustion chamber and extending from said opening to said bottom wall of said combustion chamber and forming the wall of said combustion chamber between said bottom wall and the opening in the top of said piston head and insulating said mantle from the heat of combustion in said chamber, a radial, integral portion connecting said mantle to said annular section of less thickness than said mantle to restrict the transfer of heat from said mantle to said annular section, and an integral portion connecting said bottom wall to said mantle of less thickness than said mantle to restrict the transfer of heat from said bottom wall to said mantle, so that said mantle is shielded from the heat of combustion to limit transfer of heat of combustion to said annular section, said annular section decreasing in diameter from said piston ring to the plane of said opening and when heated said annular section substantially approaching the diameter of the cylinder in a region between said piston ring and the top end of said piston.

2. A piston for an internal combustion engine comprising a piston head with a combustion chamber having a bottom wall integral with a foot portion below said wall, the major portion of said combustion chamber extending upwardly to an opening in the top of said piston, said piston head having an annular mantle spaced radially outwardly of said combustion chamber and formed with peripheral grooves for receiving piston rings and an annular portion including a top section above the upper ring having the maximum diameter of said mantle, an intermediate mantle surrounding said combustion chamber extending from the bottom wall of said combustion chamber radially and upwardly to the top of said piston and joined to the upper end of said top section by a radial, peripheral portion of less thickness than the thickness of said intermediate mantle, an annular insert of low heat conductivity relative to said piston head within the end of said piston head extending from the bottom wall of said chamber to the top of said piston and forming the wall of said combustion chamber between the bottom wall and the top of said piston head, said insert insulating said intermediate mantle from the heat of combustion and said peripheral, radial portion restricting transfer of heat from said intermediate mantle to said annular mantle and heat from said bottom wall being dissipated to said foot portion so that said annular mantle is isolated from direct transfer of heat from the combustion chamber and said top section of said annular mantle, said annular portion decreasing in diameter from said piston rings to the plane of said opening and when heated said annular portion substantially approaching the diameter of the cylinder in a region between said piston rings and the top end of said piston so that on heating of the piston said top section expands to engage the cylinder wall with the top piston ring in its groove, so as to protect the ring from excessive gas pressure and avoid deposits on the cylinder wall.

3. A piston for an internal combustion engine, comprising in combination a piston head with a combustion chamber having a bottom and an opening in the top opposite said bottom, said piston head having an annular section spaced radially outwardly of said piston chamber with peripheral grooves for receiving piston rings, said piston also including a foot portion integral with said bottom of said combustion chamber, a rotationally symmetrical mantle at least partially surrounding said combustion chamber and integral with and interconnecting said annular section and said bottom of said combustion chamber, thermal insulation additionally provided as an annular insert between said mantle and said combustion chamber, and extending from said opening toward said bottom of said combustion chamber, said mantle being joined to said annular section by a radial connecting portion which is substantially in the plane of said opening and which is of less thickness than said mantle to restrict the transfer of heat from said mantle to said annular section, and said bottom being integrally joined to said mantle by a peripheral portion of less thickness than said mantle and said bottom to restrict the transfer of heat from said bottom to said mantle, said thermal insulation extending between said radial extending portion and said peripheral portion of less thickness and forming the wall of said combustion chamber between said bottom and the top of said piston head, so that the mantle is shielded from the heat produced in said combustion chamber where heat is retained as far as possible for good and predominantly complete combustion of fuel and air components and the transfer of the heat from said bottom of the combustion chamber to the annular section is substantially restricted by the portions of less thickness joining said mantle to said bottom and to said annular section, said annular section decreasing in diameter from said piston ring to the plane of said opening and when heated said annular section substantially approaching the diameter of the cylinder in a region between said piston ring and the top end of said piston.

4. A piston in combination as claimed in claim 3, in which said thermal insulation extends from said opening substantially to said portion of less thickness joining said bottom and said mantle.

5. A piston in combination as claimed in claim 3, in which said insulating means is formed of insulation lining said mantle between said plane of the opening to the combustion chamber and the bottom of said chamber.

6. A piston in combination as claimed in claim 5, in which space is provided between said insulation and said mantle.

* * * * *